US012625333B1

(12) United States Patent
Togami et al.

(10) Patent No.: US 12,625,333 B1
(45) Date of Patent: May 12, 2026

(54) PLUGGABLE TRANSCEIVER MODULES INCLUDING HEAT SINKS BIASED AGAINST THERMAL ENERGY GENERATING COMPONENTS

(71) Applicant: Marvell Asia Pte Ltd, Singapore (SG)

(72) Inventors: Chris Togami, San Jose, CA (US);
Kee-Sin Tan, Singapore (SG); Steve Aboagye, Campbell, CA (US); Brian Dean Taylor, Laguna Niguel, CA (US)

(73) Assignee: Marvell Asia Pte Ltd, Singapore (SG)

( * ) Notice: Subject to any disclaimer, the term of this patent is extended or adjusted under 35 U.S.C. 154(b) by 256 days.

(21) Appl. No.: 18/233,013

(22) Filed: Aug. 11, 2023

Related U.S. Application Data

(60) Provisional application No. 63/397,262, filed on Aug. 11, 2022, provisional application No. 63/397,228, filed on Aug. 11, 2022.

(51) Int. Cl.
*G02B 6/42* (2006.01)
*H04B 10/40* (2013.01)

(52) U.S. Cl.
CPC ......... *G02B 6/4269* (2013.01); *G02B 6/4246* (2013.01); *G02B 6/4261* (2013.01); *G02B 6/4293* (2013.01); *H04B 10/40* (2013.01)

(58) Field of Classification Search
CPC .................................................... G02B 6/4269
See application file for complete search history.

(56) References Cited

U.S. PATENT DOCUMENTS

| | | | | |
|---|---|---|---|---|
| 2014/0064675 A1* | 3/2014 | Tanaka | ................... | G02B 6/423 |
| | | | | 385/88 |
| 2015/0078408 A1* | 3/2015 | Bukkems | ............. | G02B 6/4257 |
| | | | | 372/20 |
| 2022/0416898 A1* | 12/2022 | Kung | ................... | G02B 6/4272 |

\* cited by examiner

*Primary Examiner* — Chad H Smith

(57) ABSTRACT

A pluggable transceiver module is disclosed and includes first and second ends, lower and upper housings, and a thermal energy generating component. The first end plugs into a network device. The second end is opposite the first end and is located external to the network device when the first end is plugged into the network device. The lower housing enhouses a printed circuit board. The upper housing includes a heat sink and floats above the lower housing such that the upper housing is not fastened to and/or resting on the lower housing. At least side portions of the upper housing do not contact sides of the lower housing. The upper housing is held in place relative to the lower housing. A thermal energy generating component is mounted on the printed circuit board and supports the first heat sink, which dissipates thermal energy received from the thermal energy generating component.

40 Claims, 12 Drawing Sheets

PLUGGABLE TRANSCEIVER MODULES INCLUDING HEAT SINKS BIASED AGAINST THERMAL ENERGY GENERATING COMPONENTS

CROSS-REFERENCE TO RELATED APPLICATIONS

This application claims the benefit of U.S. Provisional Application No. 63/397,228, filed on Aug. 11, 2022 and U.S. Provisional Application No. 63/397,262, filed on Aug. 11, 2022. The entire disclosures of the applications referenced above are incorporated herein by reference.

FIELD

The present disclosure relates to pluggable transceiver modules, and more specifically to dissipation of thermal energy from pluggable transceiver modules.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A small form-factor pluggable (SFP) transceiver module is a compact transceiver used in data communication and telecommunication networks for transferring data at high speeds (e.g., 10 gigabits per second (Gb/s) to 1.6 terabits per second (Tb/s)). The SFP transceiver modules can receive and transmit data over copper lines or fiber optical cables to and from network devices, such as switches and/or other network equipment having SFP ports. As an example, a switch can have multiple SFP ports configured to receive respective SFP transceiver modules. Pluggable SFP modules generate a significant amount of heat which needs to be dissipated to support fault-free operation.

SUMMARY

A pluggable transceiver module is disclosed and includes a first end, a second end, a lower housing, an upper housing, and a thermal energy generating component. The first end is configured to plug into a network device. The second end is opposite the first end and is configured to be located external to the network device when the first end is plugged into the network device. The lower housing enhouses a printed circuit board. The upper housing includes a first heat sink and configured to float above the lower housing such that the upper housing is not at least one of fastened to and resting on the lower housing. At least side portions of the upper housing do not contact sides of the lower housing. The upper housing is held in place relative to the lower housing. A thermal energy generating component is mounted on the printed circuit board and is configured to support the first heat sink, which dissipates thermal energy received from the thermal energy generating component.

In other features, the pluggable transceiver module further includes a second heat sink forward of the first heat sink. The upper housing is held in place relative to the lower housing using attachment points at ends of the upper housing. The attachment points refer to i) a portion of the second heat sink overhanging flanges of the lower housing, and ii) hooked portions of the upper housing engaging hooked portions of the lower housing.

In other features, the upper housing is configured to float above the lower housing such that gaps exist between the side portions of the upper housing and sides of the lower housing.

In other features, the pluggable transceiver module further includes a holding clip configured to at least partially hold the upper housing in place relative to the lower housing. In other features, the holding clip is configured to at least partially hold the lower housing in place relative to the upper housing. In other features, the first heat sink includes a recessed area. The holding clip is disposed in the recessed area.

In other features, at least one gap exists between the first heat sink and the holding clip. The holding clip is configured, due to the gap, to flex around the first heat sink and hook onto the lower housing and bias the first heat sink against the thermal energy generating component.

In other features, the holding clip includes one or more hooks that are configured to mate with corresponding receptacles formed in the lower housing to fix the floating upper housing in place relative to the lower housing.

In other features, the first heat sink includes a thermally conductive boss and heat radiating elements. The thermally conductive boss is configured to contact the thermal energy generating component. The heat radiating elements are configured to extend away from the thermally conductive boss and dissipate thermal heat from the first heat sink.

In other features, the thermally conductive boss extends downward from the heat radiating elements and abuts the thermal energy generating component. In other features, a thermal interface material is disposed at least partially between the thermally conductive boss and the thermal energy generating component and exhibits less thermal resistance as compared to an air gap between the thermally conductive boss and the thermal energy generating component.

In other features, the side portions of the upper housing are configured as a pair of flanges. The pair of flanges extend downwardly from a body of the upper housing toward sides of the lower housing to at least one of i) hold the upper housing in a lateral orientation relative to the lower housing, and ii) limit or prevent movement of the upper housing laterally relative to the lower housing. In other features, the pair of flanges and a thermally conductive boss of the first heat sink at least partially define a pair of channels.

In other features, a communication system is disclosed and includes the pluggable transceiver module and the network device. The network device includes a motherboard. The motherboard includes an integrated circuit for processing and transferring data to and from the pluggable transceiver module. The pluggable transceiver module is plugged into the motherboard.

In other features, a pluggable transceiver module is provided and includes a first end, a second end, a lower housing component, a thermal energy generating component, a wedge-shaped shim, and an upper housing. The first end is configured to plug into a network device. The second end is opposite the first end and the second end and is configured to be located external to the network device when the first end is plugged into the network device. The lower housing component enhouses a printed circuit board. The thermal energy generating component is disposed on the printed circuit board. The wedge-shaped shim is configured to be in thermal contact with the thermal energy generating component and configured to transfer thermal energy away from the thermal energy generating component. The upper housing is configured to thermally contact the wedge-shaped shim and the lower housing component. The upper housing includes a heat sink. The heat sink is disposed on the wedge-shaped shim configured to dissipate thermal energy received from the wedge-shaped shim.

In other features, the thermal energy generating component is a digital signal processor. In other features, the wedge-shaped shim includes a first surface, a second surface and side surfaces extending between the first surface and the second surface. The first surface extends parallel to and thermally contacts a surface of the upper housing. The second surface extends parallel to and contacts the thermal energy dissipating component.

In other features, the pluggable transceiver module further includes at least one biasing element. The at least one biasing element is configured to bias the wedge-shaped shim toward a surface of the upper housing and provide thermal contact with the thermal energy generating component and the heat sink.

In other features, the at least one biasing element includes a screw disposed between a side of the upper housing and the wedge-shaped shim. In other features, the at least one biasing element includes a spring disposed between a side of the upper housing and the wedge-shaped shim.

In other features, the spring is a leaf spring including first members biased against the side of the upper housing and second members biased against a side of the wedge-shaped shim. In other features, the thermal energy generating component is mounted on the printed circuit board.

In other features, the pluggable transceiver module further includes another component mounted on the printed circuit board. The thermal energy generating component is disposed on the another component. In other features, the another component is an interposer or a chip.

In other features, thermal interface material is disposed at least one of i) between the wedge-shaped shim and the upper housing, and ii) between the wedge-shaped shim and the thermal energy generating component.

In other features, the wedge-shaped shim contacts the upper housing and the thermal energy generating component. In other features, the upper housing is structured as a heat sink.

In other features, a communication system is disclosed and includes the pluggable transceiver module and the network device. The network device includes a motherboard. The motherboard includes an integrated circuit for processing and transferring data to and from the pluggable transceiver module. The pluggable transceiver module is plugged into the motherboard.

In other features, a pluggable transceiver module is disclosed and includes a first end, a second end, a lower housing, an upper housing, and a thermal energy generating component. The first end is configured to plug into a network device. The second end is opposite the first end and is configured to be located external to the network device when the first end is plugged into the network device. The lower housing enhouses a printed circuit board. The upper housing includes a heat sink. The upper housing is supported by the printed circuit board and separated from held in place relative to the lower housing. The thermal energy generating component is mounted on the printed circuit board and dissipates thermal energy to the heat sink.

In other features, the pluggable transceiver module further includes a thermal interface material disposed between the heat sink and the thermal energy generating component. The thermal interface material having a lower thermal resistance than air.

In other features, the pluggable transceiver module further includes pins extending through the lower housing, the printed circuit board, and the upper housing and configured to hold the upper housing in place relative to the lower housing.

In other features, the upper housing includes flanges extending down from the upper housing a resting on the printed circuit board to support the upper housing above the thermal energy generating component.

In other features, the flanges are triangle shaped and extend from sides of the upper housing. In other features, the lower housing includes flanges extending upward and supporting the printed circuit board.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
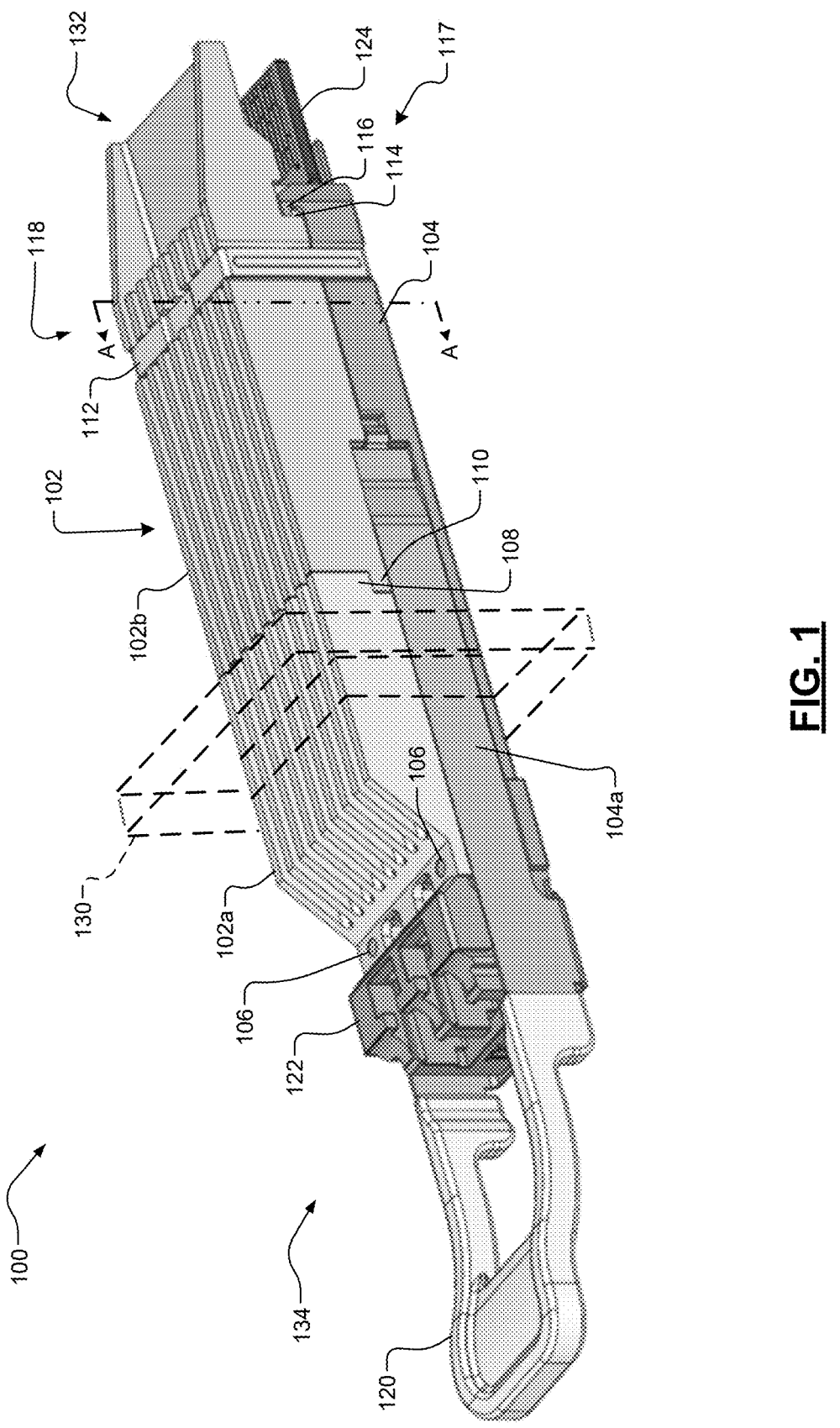
FIG. 1 is a perspective view of an example pluggable transceiver module including a two-part heat sink with a floating portion and a holding clip in accordance with the present disclosure.

Pluggable transceiver modules, such as SFP transceiver modules, quad SFP (QSFP) transceiver modules, QSFP double density (QSFP-DD) transceiver modules, and octal SFP (OSFP) transceiver modules, have corresponding dimension and tolerance requirements set according to a multi-source agreement (MSA) in order to be compatible with corresponding industry standard ports of network equipment. For example, some QSFP-DD transceiver modules have a mechanical component tolerance for an integrated circuit (e.g., digital signal processor) of ±270 microns or more referring to a minimum gap between the integrated circuit and a heat sink located above the integrated circuit. In order to improve transfer of thermal energy from the integrated circuit to the heat sink, thermally conductive material (TIM) can be disposed between the integrated circuit and the heat sink. The TIM can have a thermal conductivity of 4-18 watts per meter-Kelvin (W/mK).

Some pluggable transceiver modules produce 20 watts (W) or more of thermal power that needs to be dissipated. Various electrical and optical components (e.g., processor, amplifier, laser, driver, etc.) of pluggable transceiver modules produce thermal power. A large portion of the thermal power is produced by a digital signal processor (DSP). Some DSPs can produce greater than or equal to 10 W of thermal power. The amount of area over a DSP of a pluggable transceiver module that is available for dissipating thermal power is small and can be limited by the size of a window opening of a corresponding cage if included. A QSFP-DD can, for example, have a cage in which the pluggable transceiver module is inserted. Thermal energy is transferred from the DSP to a heat sink above the DSP. The thermal energy is then dissipated from the heat sink through the cage. The cage has a window over the DSP and heat sink to improve dissipation of the thermal energy away from the heat sink. The thermal energy is dissipated through the window and into a box of a network device (e.g., a switch). The cage can have an integrated spring-loaded heat sink that is pressed against the top housing (or heat sink) of the corresponding pluggable transceiver module and is limited by size of the window of the cage and contact area of the heat sink.

TIM can be used between a DSP of a pluggable transceiver module and a heat sink to improve thermal energy transfer from the DSP to the heat sink and to fill the space associated with the minimum tolerance gap between the DSP and the heat sink. Thickness of the TIM can vary between the DSP and the heat sink. The thicker the TIM the more thermal resistance. Thermal conductivity of TIM remains the same with varying thickness of the TIM and can be, for example, 4-18 W/mK. Also, TIM can become compacted over time due to movement of the DSP relative to the heat sink. The DSP can move due to flexing of a PCB on which the DSP is mounted. The PCB can flex, for example, when the pluggable transceiver module is plugged into a SFP port or the like on a network device. An end of the PCB board includes first electrical contacts, which contact corresponding second electrical contacts on a motherboard of the network device. The end of the PCB is plugged into a connector on the motherboard such that the first electrical contacts the second electrical contacts.

The compacting of TIM can result in air gaps. The air gaps have a higher thermal resistance than that of TIM. The varying thickness of TIM and the air gaps results in poor dissipation performance and potential overheating of the DSP and thus reduced reliability of the DSP. For at least the above-stated reasons, TIM can have limited and varying heat dissipation performance.

The examples set forth herein include pluggable transceiver modules configured such that the gap between a DSP and a heat sink is minimized and/or eliminated. In accordance with other embodiments, pluggable transceiver modules having a floating and non-floating heat sinks are disclosed. In an embodiment, a floating heat sink is at least one of configured to abut and support a thermal energy generating component. The floating heat sink and the thermal energy generating component are located above a lower housing. In an embodiment, a bottom edge of the floating heat sink is not in contact with the lower housing. A gap exists between the floating heat sink and the lower housing. The gap exists between attachment points for the upper and lower housings, the upper housing including the heat sink.

In an embodiment, the floating heat sink is in direct contact with the thermal energy generating component and/or TIM. The floating heat sink can also be in direct contact with a lid, which itself is not heat generating. In another embodiment, the TIM is disposed between the floating heat sink and the thermal energy generating component. Another pluggable transceiver module having a wedge-shaped thermal interface shim between a thermal energy generating component and a heat sink is disclosed. The wedge-shaped thermal interface shim is biased such that the thermal energy generating component and the heat sink are in contact with the wedge-shaped shim. The wedge-shaped thermal interface shims disclosed herein are referred to simply as wedge-shaped shims.

FIG. 1 shows a pluggable transceiver module 100 including a two-part heat sink having a first portion 102a and a second portion 102b, collectively the heat sink 102. The second portion 102b is referred to as an upper housing that is disposed over a lower housing 104. In an embodiment, the lower housing 104. The first portion 102a is fastened to a release member 107 via fasteners (e.g., screws) that extend through holes 106 in the first portion 102a. The release member 107 is used as a pull release to unlock the pluggable transceiver module 100 from, for example, a cage and allow the module to be extracted from the cage. The first portion 102a includes an end 108 that overhangs flanges 110 of the second portion 102b. The second portion 102b is held in place by the first portion 102a, by the lower housing 104, and by a holding clip 112. The holding clip 112 wraps around the top and sides of the second portion 102b and the sides and bottom of the lower housing 104. The holding clip 112 provides limited pressure against the second portion 102b to bias the second portion 102b against a thermal energy generating component, as further described below. The providing of limited pressure, is unlike screws or other similar types of fasteners, where too much force can be applied, resulting in breakage of components and/or electrical connections. The limited pressure provided by the holding clip 112 also allows for TIM to be used between the second portion 102b and the thermal energy generating component 202. In an embodiment, the second portion 102b includes two hooked portions 114 that engage with two hooked portions 116 of the second portion 104b. One of each of the hooked portions 114, 116 is shown in FIG. 1. One of each of the hooked portions 114, 116 is located on each of sides 117, 118 of the pluggable transceiver module 100. The end 108, flanges 110, hooked portions 114, 116 refer to attachment points that are used to hold the second portion (or upper housing) 102b in place relative to the lower housing 104.

In an embodiment, the heat sink 102 and the lower housing 104 are formed of at least one of copper, aluminum, a copper alloy such as for example beryllium copper, and/or other suitable thermally conductive material. In an embodiment, the holding clip 112 is formed of at least one of stainless steel, copper, a copper alloy such as beryllium copper and/or other suitable material. In an embodiment, the holding clip 112 is formed of stainless steel.

The pluggable transceiver module 100 further includes a handle 120, a connector 122, and a PCB 124. The connector 122 is configured for receiving copper cables or optical cables including optical fibers, depending on whether the pluggable transceiver module 100 is configured for reception and transmission of electrical signals or optical signals. In an embodiment, the pluggable transceiver module 100 is configured for Ethernet communication via copper cables. In another embodiment, the pluggable transceiver module 100 is configured for optical communication via optical cables. When configured for Ethernet communication with a device remotely located from the pluggable transceiver module 100, the PCB 124 includes electrical components. The electrical components are used for i) transmitting and receiving electrical signals to and from the remotely located device, and ii) transmitting and receiving electrical signals to and from, for example, a motherboard of a network device that the pluggable transceiver module 100 is plugged into via the PCB 124. When configured for optical communication with a remotely located device, the PCB 124 includes both optical and electrical components. The optical components are used for transmitting and receiving optical signals to and from the remotely located device via the connector 122. The electrical components are used for transmitting and receiving electrical signals to and from, for example, the motherboard of the network device that the pluggable transceiver module is plugged into via the PCB 124.

A dashed plate 130 is shown and represents a portion of a cage or a bezel of a network device that the pluggable transceiver module 100 is plugged into. In an embodiment, the pluggable transceiver module 100 is inserted into a cage, which is inserted into a bezel of a network device, or is inserted directly into the bezel of the network device. Springs may be disposed between the plate 130 and the pluggable transceiver module 100, for example, between the plate 130 and the top and sides of the first portion 102a of the heat sink 102, and between the plate 130 and the bottom and sides of the first portion 104a of the lower housing 104. When plugged in, a first end 132 of the pluggable transceiver module 100 is plugged into, for example, a motherboard of the network device and a second end 134 of the pluggable transceiver module 100 is external to the network device.

Figure 2:
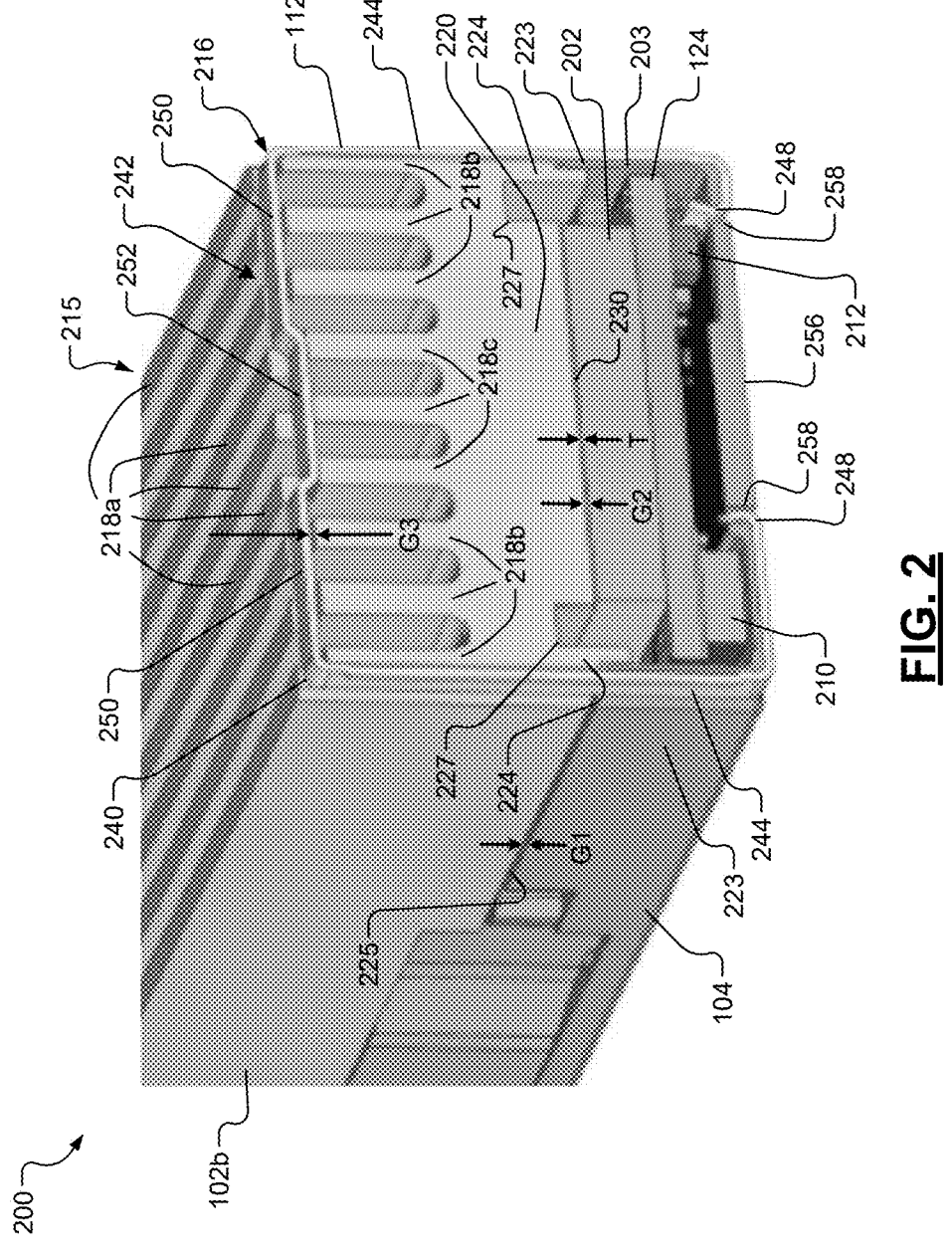
FIG. 2 is a cross-sectional view of the pluggable transceiver module of FIG. 1 through section line A-A of FIG. 1 illustrating the floating upper heat sink supported by a thermal energy generating component.

FIG. 2 shows a portion 200 of the pluggable transceiver module 100 of FIG. 1 including: the second portion 102b of the heat sink 102; the lower housing 104; the holding clip 112; the PCB 124; and a thermal energy generating component 202, such as an integrated circuit, a DSP, an amplifier, a driver, and/or other thermal energy generating component. In an embodiment, the thermal energy generating component 202 is a DSP. The thermal energy generating component 202 generates and dissipates heat and is mounted on the PCB 124 and is disposed between the PCB 124 and the second portion 102b. The PCB 124 extends within a channel 203 of the lower housing 104. In the shown example embodiment, the second portion 102b is supported by the thermal energy generating component 202. In other embodiments, an upper housing (or second portion of an upper housing) is not supported by a thermal energy generating component, such as the upper housing of FIGS. 11-12. The PCB 124 is supported by the lower housing 104. Circuit components, other than the thermal energy generating component 202, are mounted on and/or are connected to the PCB 124. The circuit components are mounted to the top and bottom of the PCB 124. Examples of the circuit components are a laser, an optical detector, amplifiers (e.g., a transimpedance amplifier), a driver, filters, connectors, etc. Some of the circuit components are shown and designated 210, 212.

The second portion 102b includes i) a non-recessed area 215, ii) a recessed area 216 for receiving the holding clip 112, iii) heat radiating fins (or radiating elements) 218 for dissipating thermal energy, and iv) a thermally conductive boss 220. The radiating fins 218 including portions 218a, 218b and 218c. Portions 218b, 218c are in the recessed area 216. Portions 218a are taller and extend further away from the thermally conductive boss 220 than portions 218b and 218c. Portions 218b are taller and extend further away from the thermally conductive boss 220 than portions 218c. The second portion 102b also includes flanges (or side portions) 224, which are disposed above and extend downward toward sides 223 of the lower housing 104. A gap G1 exists between the flanges 224 and the lower housing 104. In an embodiment, the gap G1 extends laterally along the second portion 102b from the flanges 110 (shown in FIG. 1) to the hooked portions 114 (shown in FIG. 1) such that the bottom edges 225 of the second portion 102b do no contact the lower housing 104. Channels 227 exist between the flanges 224 and the thermally conductive boss 220. The flanges 224 and the thermally conductive boss 220 at least partially define the channels 227.

The thermally conductive boss 220 is disposed above and in the embodiment depicted is supported by the thermal energy generating component 202. In other embodiments, the thermally conductive boss 220 is not supported by a thermal energy generating component. As an example, see the embodiment of FIGS. 11-12, which includes an upper housing that is not supported by a thermal energy generating component. In an embodiment, the thermally conductive boss 220 abuts the thermal energy generating component 202. In an embodiment, a thin layer of TIM 230 is disposed between the thermally conductive boss 220 and the thermal energy generating component 202. In another embodiment, the TIM 230 is not included. In an embodiment, the TIM 230 is a thermal interface grease that fills surface depressions due to surface irregularities of the thermally conductive boss 220 and the thermal energy generating component 202. As an example and in an embodiment, the TIM 230 has a thickness T of less than 50 microns. The thickness T can vary across the surfaces of the thermally conductive boss 220 and the thermal energy generating component 202. In yet another embodiment, the thermally conductive boss 220 is in contact with the thermal energy generating component 202. In still another embodiment, the thermally conductive boss 220 is in contact with the thermal energy generating component 202 and TIM is i) disposed in depressions of surfaces of the thermally conductive boss 220 and/or the thermal energy generating component 202 as further described below with respect to FIG. 3, and ii) between the thermally conductive boss 220 and the thermal energy generating component 202. In an embodiment, a gap G2 exists between the thermally conductive boss 220 and the thermal energy generating component 202.

The holding clip 112 includes a body 240 having a center portion 242 and a pair of arms 244. In an embodiment, the holding clip 112 includes a pair of hooks 248 as shown, or other engaging and/or coupling elements.

The center portion 242 includes a pair of intermediate members 250 and a recessed center member 252. Each of the intermediate members 250 extends from the center member 252 to one of the arms 244. The intermediate members 250 are disposed over the portions 218b of the radiating fins 218. The recessed center member 252 is disposed over the portions 218c of the radiating fins 218. The recessed member 252 is configured to fix the arms 244 (or clamped together members) in a predetermined lateral orientation. In the example shown, the hooks 248 extend from the arms 244 and into and/or through a bottom wall 256 of the lower housing 104. In an embodiment, the hooks 248 extend through slots 258 in the bottom wall 256. In an embodiment, instead of including the hooks 248, one or more other engaging and/or coupling elements are included which do not extend through and/or couple the bottom wall 256.

A gap G3 exists between each of the portions 218b and one of the intermediate members 250. The gaps between the portions 218b and one of the intermediate members 250 allow the arms 244 to flex over and down and around the second portion 102b of the heat sink 102. The arms 244 splay out when the holding clip 112 is pushed onto and over the second portion 102b and the lower housing 104.

Figure 3:
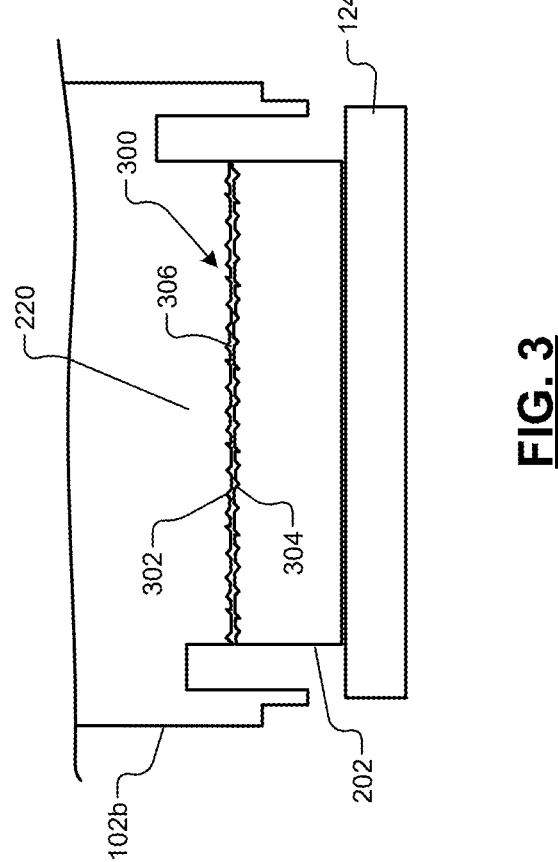
FIG. 3 is a cross-sectional close-up view of a part of the floating upper heat sink, the thermal energy generating component and a corresponding printed circuit board (PCB) in accordance with the present disclosure.

FIG. 3 shows a close-up view of the floating upper heat sink (or second portion 102b), the thermal energy generating component 202 and a corresponding PCB 124 illustrating a thermal energy interface 300. The floating upper heat sink 102b includes the thermally conductive boss 220 that is supported by the thermal energy generating component 202, which is supported by the PCB 124. In an embodiment, a bottom surface 302 of the thermally conductive boss 220 and/or a top surface 304 of the thermal energy generating component 202 has surface imperfections, irregularities, inequalities, ridges, and/or projections resulting in small areas and/or air gaps between the surfaces 302, 304. In the example shown, the surfaces 302, 304 are in contact with each other. The small areas and/or air gaps are filled with TIM (e.g., thermal interface grease), designated 306. This aids in providing improved thermal conductivity between the surfaces 302, 304, in comparison to a configuration without a TIM.

The floating upper heat sink 102b has high thermal conductivity (e.g., 113-370 W/mk), depending on the material of the floating upper heat sink 102b. For instance, if formed of zinc, the thermal conductivity can be, for example, 113 W/mK or other level of thermal conductivity depending on the makeup and configuration of the floating upper heat sink 102b. If formed of aluminum, the thermal conductivity can be, for example, 170 W/mK or other level of thermal conductivity depending on the makeup and configuration of the floating upper heat sink 102b. If formed of a copper alloy, the thermal conductivity can be, for example, 370 W/mK or other level of thermal conductivity depending on the makeup and configuration of the floating upper heat sink 102b. In some embodiments, the thermal conductivity when the floating heat sink is formed of zinc, aluminum, or a copper alloy is respectively ~113 W/mK, ~170 W/mk, or ~370 W/mK.

Figure 4:
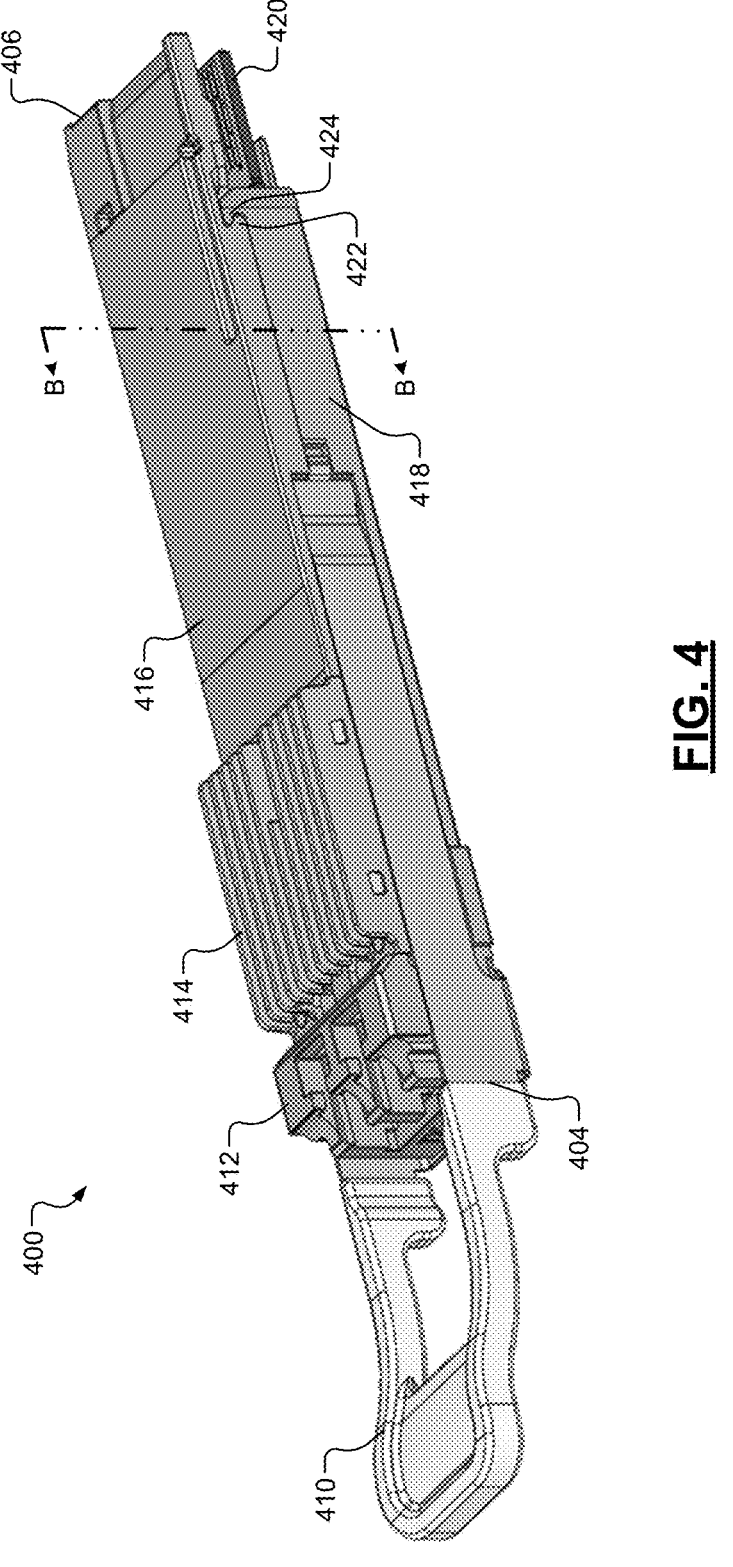
FIG. 4 is a perspective view of an example pluggable transceiver module including a wedge-shaped shim for thermal energy transfer in accordance with another embodiment the present disclosure.
Figure 5:
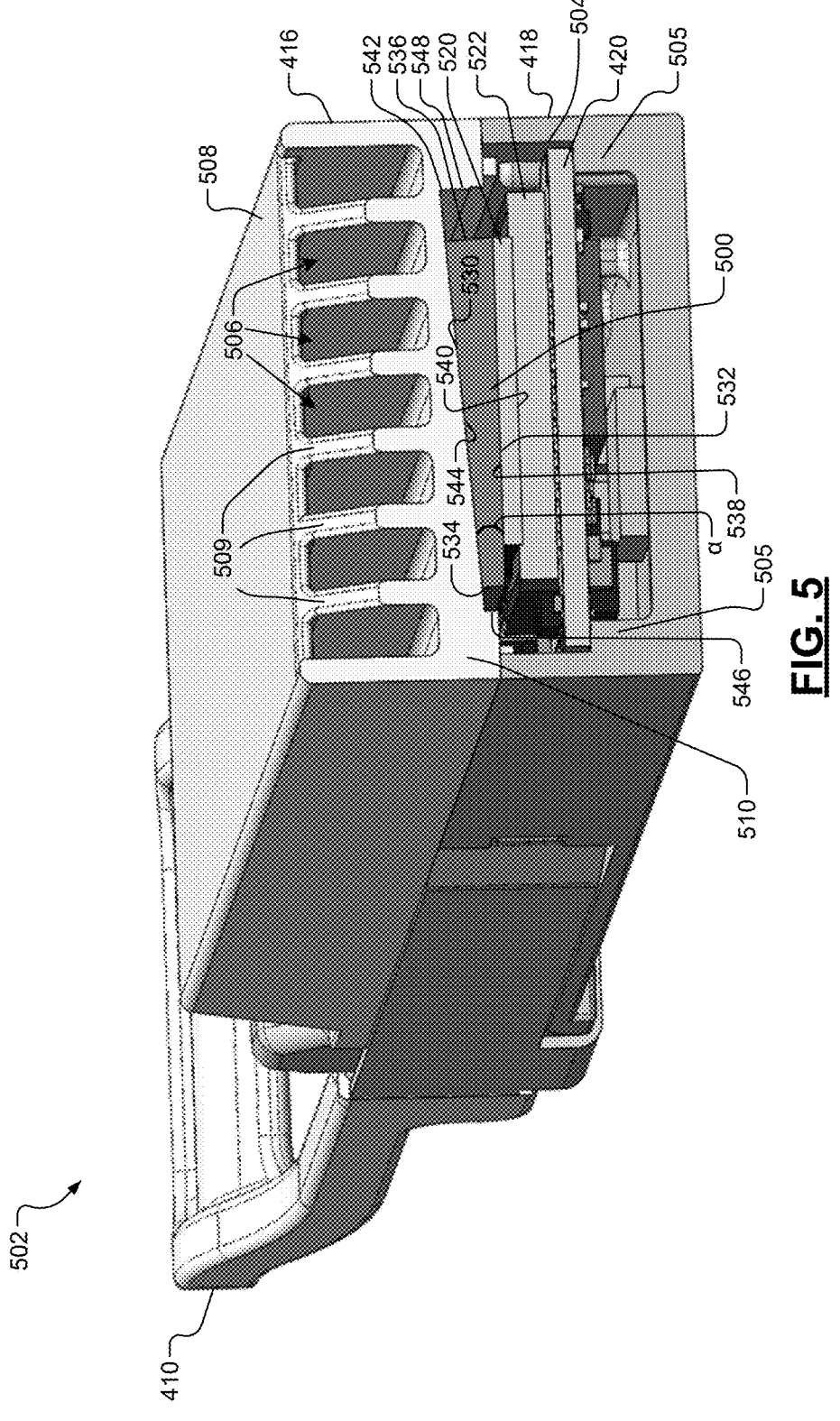
FIG. 5 is a cross-sectional perspective view of a portion of the pluggable transceiver module of FIG. 4 through section line B-B of FIG. 4.

FIGS. 4-5 show a pluggable transceiver module 400 including a wedge-shaped shim 500 for thermal energy transfer. The wedge-shaped shim 500 is shown in FIG. 5. FIG. 5 depicts a cross-sectional perspective view of the pluggable transceiver module 400 at section line B-B looking toward a handle end 404 of the pluggable transceiver module 400 and away from a pluggable end 406 of the pluggable transceiver module 400. The pluggable transceiver module 400 includes a handle 410, a connector 412, a heat sink 414, an upper housing 416, a lower housing 418, and a PCB 420. The upper housing 416 includes hooked portions 422 that engage with hooked portions 424 of the lower housing 418. One of each of the hooked portions 422, 424 is shown in FIG. 4. The upper housing 416 includes two hooked portions 422 and the lower housing 418 includes two hooked portions 424.

The connector 412, which is similar to the connector 122 of FIG. 1, is configured for receiving copper cables or optical cables, depending on whether the pluggable transceiver module 400 is configured for reception and transmission of electrical signals or optical signals. In an embodiment, the pluggable transceiver module 400 is configured for Ethernet communication via copper cables. In another embodiment, the pluggable transceiver module 400 is configured for optical communication via optical cables.

FIG. 5 shows a portion 502 of the pluggable transceiver module 400. The portion 502 includes the handle 410, the upper housing 416, the lower housing 418, and the PCB 420. The lower housing 418 is in contact with and supports the upper housing 416. The PCB 420 extends within a channel 504 of the lower housing 418 and is supported by a pair of side ledges 505. The upper housing 416 is configured as a heat sink and includes channels 506 for passage of air or other suitable fluid for cooling a top member 508, intermediate members 509, and a bottom member 510 of the upper housing 416. The intermediate members 509 extend from the bottom member 510 to the top member 508.

Figure 12:
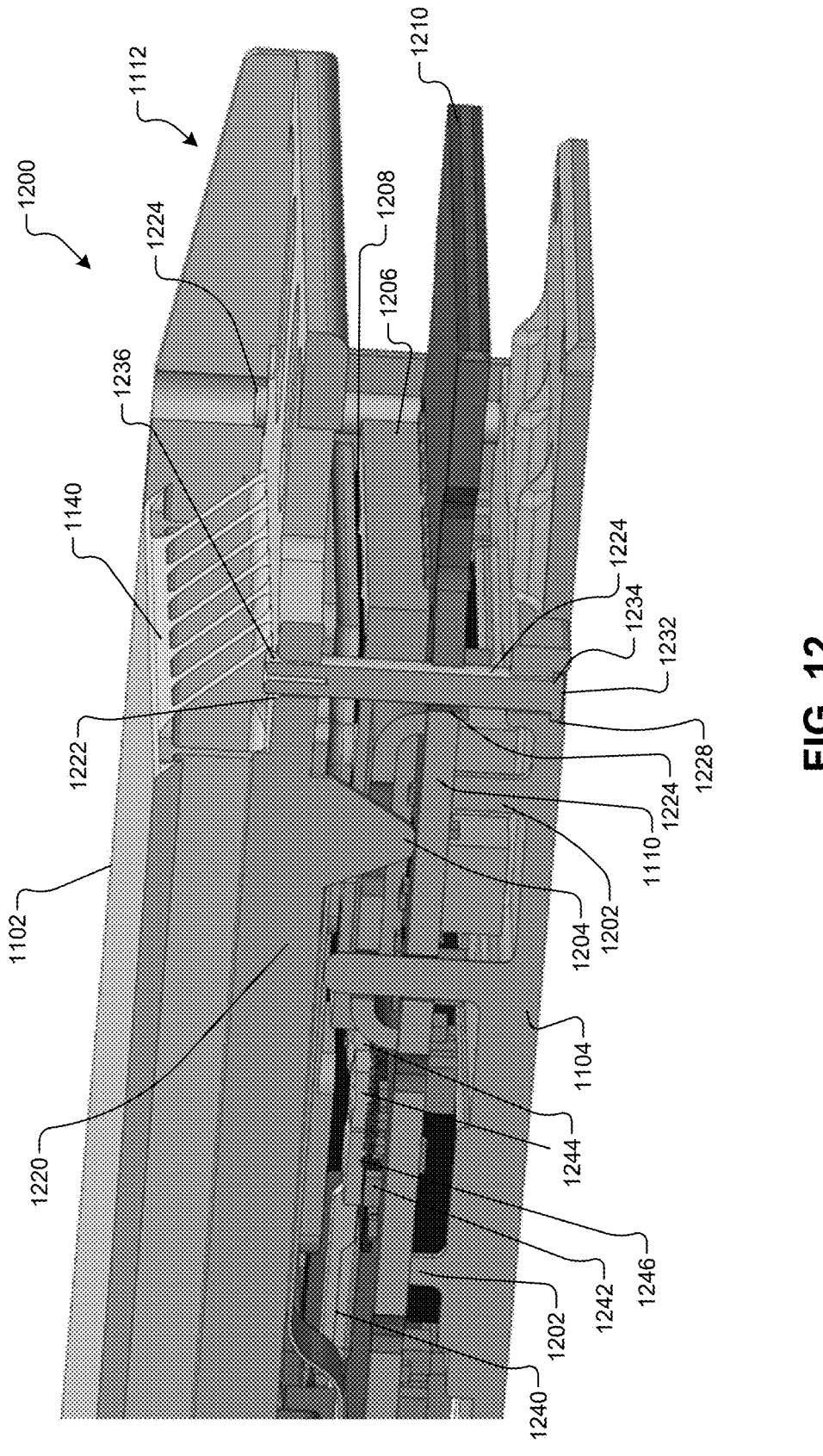
FIG. 12 is a perspective cross-sectional view of a portion of the pluggable transceiver module of FIG. 11 through section line C-C of FIG. 11 illustrating support of the upper housing.

The pluggable transceiver module 400 includes the wedge-shaped shim 500, which is disposed between the bottom member 510 of the upper housing 416 and a thermal energy generating component 520, such as an integrated circuit, a processor, an active optical component such as a light engine and/or other circuit component. The thermal energy generating component 520 generates and dissipates heat. Thermal energy is directly transferred from the thermal energy generating component 520 to the wedge-shaped shim 500, which then transfers the thermal energy to the upper housing 416. The thermal energy generating component 520 is disposed on a component 522, such as an interposer or other integrated circuit. The component 522 is mounted on the PCB 420. In an embodiment, the component 522 is not included and the thermal energy generating component 520 is directly mounted on the PCB 420. In an embodiment, the integrated circuit is a digital signal processor or other circuit component. Other circuit components are attached to the PCB 420, some of which are shown below the PCB 420. Circuit components such as a laser, a silicon photonics chip, transimpedance amplifiers, and a driver, can be mounted on the PCB 420. The silicon photonics chip converts optical signals to electrical signals and converts electrical signals to optical signals. The transimpedance amplifiers (TIAs) and driver can be implemented as chips mounted on the silicon photonic chip. In an embodiment, the silicon photonics chip is mounted on a top side of the PCB 420 along with a DSP. The DSP being the thermal energy generating component 202, which is mounted rearward of the silicon photonics chip. Examples of a silicon photonics chip, TIA chips and a driver chip are shown in FIG. 12.

The wedge-shaped shim 500 includes a body having an upper surface 530, a bottom surface 532 and side surfaces 534, 536. Pressure is applied against the wedge-shaped shim 500 such that the wedge-shaped shim 500 is biased against the upper housing 416 and the thermal energy generating component 520. The bottom surface 532 extends parallel to at least one of a top surface 538 and bottom surface 540 of the thermal energy generating component 520. The top surface 538 does not extend parallel to the bottom surface 540 but rather extends at an acute angle α relative to the bottom surface 540. An upper portion of the wedge-shaped shim 500 is disposed in a channel 542 of the upper housing 416. The channel 542 includes a surface 544 extending parallel to and contacting the upper surface 530 of the wedge-shaped shim 500. The surface 544 is thus formed at the same angle α relative to the upper surface 530. The plane of reference of angle alpha of surface 544 is the same as for surface 530, namely both have the same angle or orientation relative to surfaces 538, 532. The channel 542 also includes side surfaces 546, 548 that extend downward from the bottom member 510.

The wedge-shaped shim 500 is configured to be moved laterally between the side surfaces 546, 548. Illustrated examples of movement of a wedge-shaped shim are provided by FIGS. 6A and 6B. Lateral movement of the wedge-shaped shim 500 in a first direction (i.e., toward the surface 544) results in the wedge-shaped shim 500 eliminating a gap between the wedge-shaped shim 500 and the upper housing 416. Lateral movement of the wedge-shaped shim 500 in a second direction (i.e., away from the surface 544) opposite the first direction such that a gap exists between the wedge-shaped shim 500 and the upper housing 416. The wedge-shaped shim 500 is moved in the first direction and then held in place such that the upper housing 416 is in contact with the wedge-shaped shim 500. This provides direct transfer of thermal energy from the wedge-shaped shim 500 to the upper housing 416. Moving the wedge-shaped shim 500 into place improves thermal coupling between the wedge-shaped shim 500 and the upper housing 416.

In an embodiment, the upper housing 416 and the lower housing 418 are formed of at least one of copper, a copper alloy such as beryllium copper, or other suitable thermally conductive material. In an embodiment, the wedge-shaped shim 500 is formed of at least one of copper, a copper alloy such as beryllium copper, aluminum, stainless steel, and/or other suitable material. In an embodiment, the upper housing 416 and/or the wedge-shaped shim 500 are formed of recyclable materials. In an embodiment, TIM is not included between surfaces 530 and 544 and/or between surfaces 538 and 532. In another embodiment, TIM is included between surfaces 530 and 544 and/or between surfaces 538 and 532. In yet another embodiment, the TIM is a thermal interface grease. As an example and in an embodiment, the TIM between surfaces 530 and 544 has a thickness of less than 50 microns. As an example and in an embodiment, the TIM between surfaces 538 and 532 has a thickness of less than 50 microns.

Figure 6A:
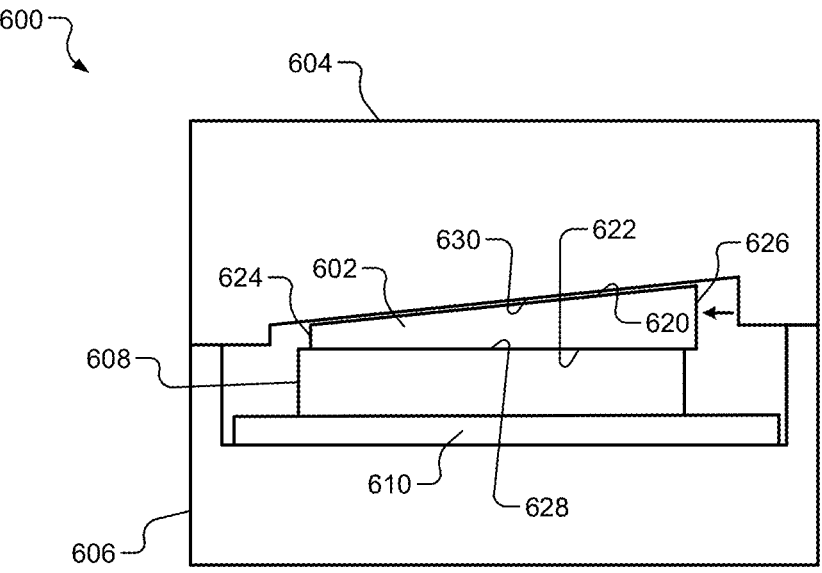
FIG. 6A is a cross-sectional view of another example pluggable transceiver module including a wedge-shaped shim in an unbiased state in accordance with the present disclosure.
Figure 6B:
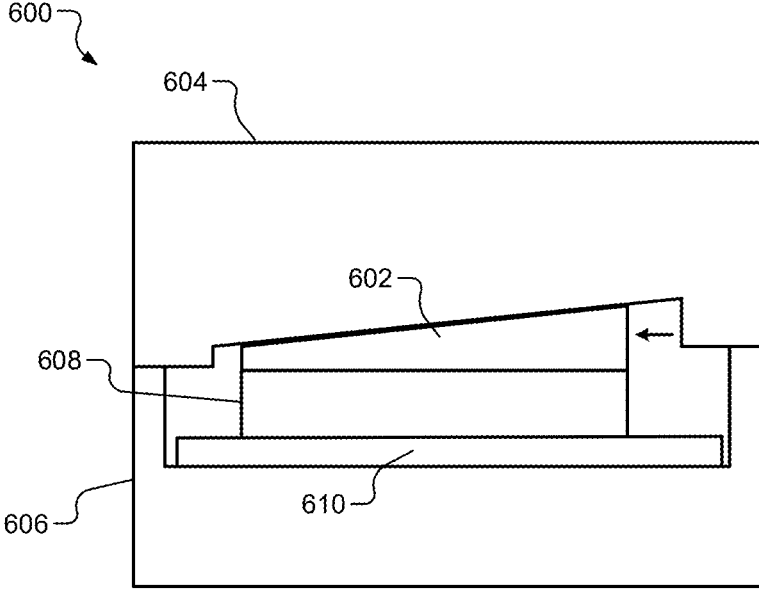
FIG. 6B is a cross-sectional view of the pluggable transceiver module of FIG. 6A with the wedge-shaped ship in a biased state in accordance with the present disclosure.

FIG. 6A shows a portion 600 of a pluggable transceiver module including a wedge-shaped shim 602 in an unbiased state. FIG. 6B shows the portion 600 of the pluggable transceiver module of FIG. 6A with the wedge-shaped shim 602 in a biased state. The pluggable transceiver module includes an upper housing 604, which includes channels similar to the channels 506 of FIG. 5, and a lower housing 606. The wedge-shaped shim 602 is disposed on a thermal energy generating component 608, which is mounted on a PCB 610. The PCB 610 is supported by the lower housing 606. FIGS. 6A and 6B provide an example of when the thermal energy generating component 608 generates and dissipates heat and is mounted directly on the PCB 610, unlike the thermal energy generating component 520 of FIG. 5.

The wedge-shaped shim 602 includes a top surface 620, a bottom surface 622, and side surfaces 624, 626. The bottom surface 622 extends parallel to and contacts a top surface 628 of the thermal energy generating component 608. The top surface 620 extends parallel to a bottom surface 630 of the upper housing 604. When in an unbiased (or withdrawn) state, as shown in FIG. 6A, the top surface 620 i) contacts or does not contact the bottom surface 630, and ii) does not apply pressure on the bottom surface 630. When in a biased state, as shown in FIG. 6B, the top surface 620 does contact and does apply pressure on the bottom surface 630. Sliding of the wedge-shaped shim 602 from right to left results in a vertical reduction of the gap between the wedge-shaped shim 602 and the upper housing 604.

In an embodiment, TIM is not included between surfaces 620 and 630 and/or between surfaces 622 and 628. In another embodiment, TIM is included between surfaces 620 and 630 and/or between surfaces 622 and 628. In another embodiment, the TIM is a thermal interface grease. As an example and in an embodiment, the TIM between surfaces 620 and 630 has a thickness of less than 50 microns. As an example and in an embodiment, the TIM between surfaces 622 and 628 has a thickness of less than 50 microns.

Figure 7:
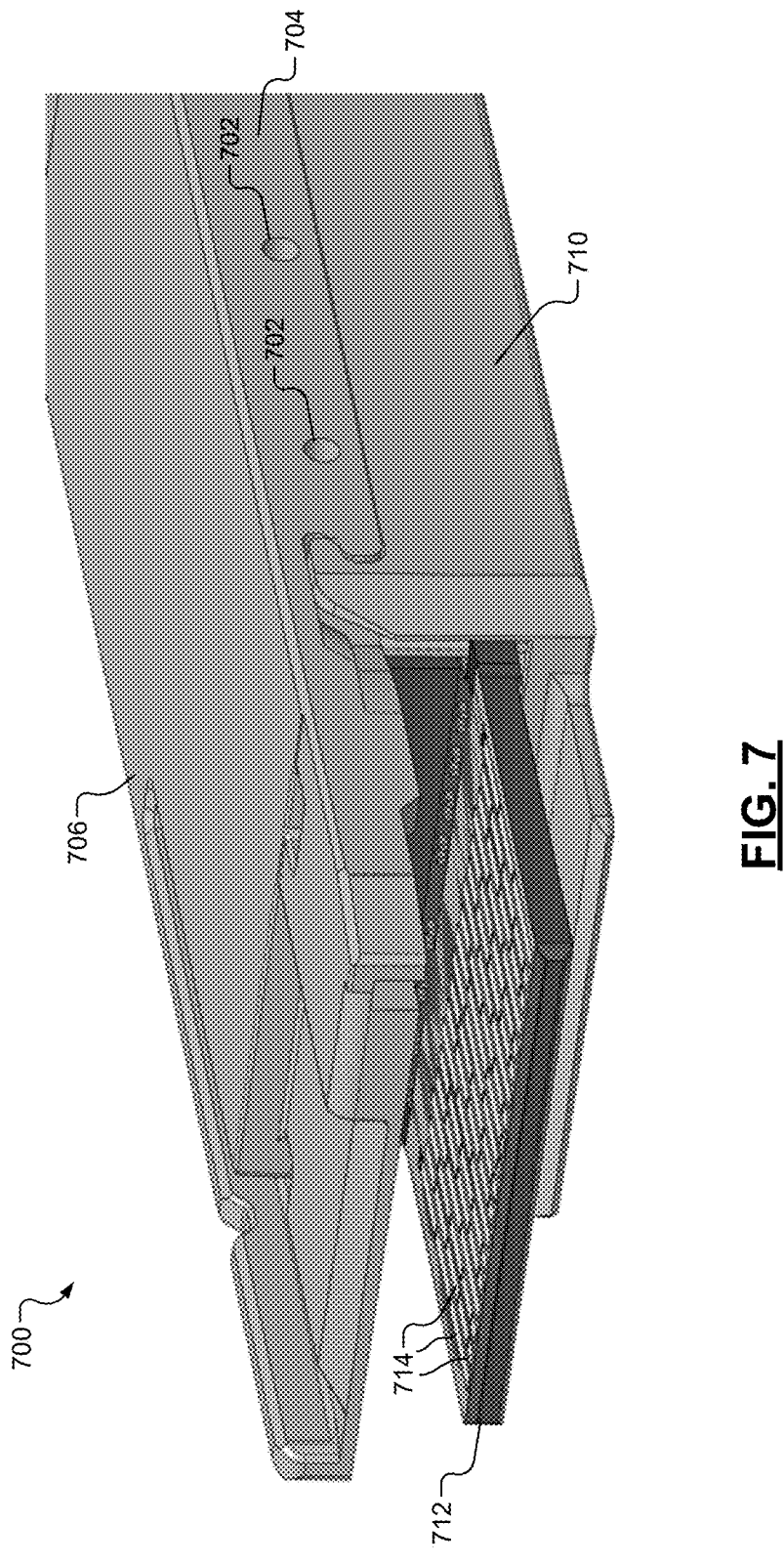
FIG. 7 is a perspective view of a portion of an example pluggable transceiver module illustrating side holes for biasing a wedge-shaped shim in accordance with the present disclosure.
Figure 8:
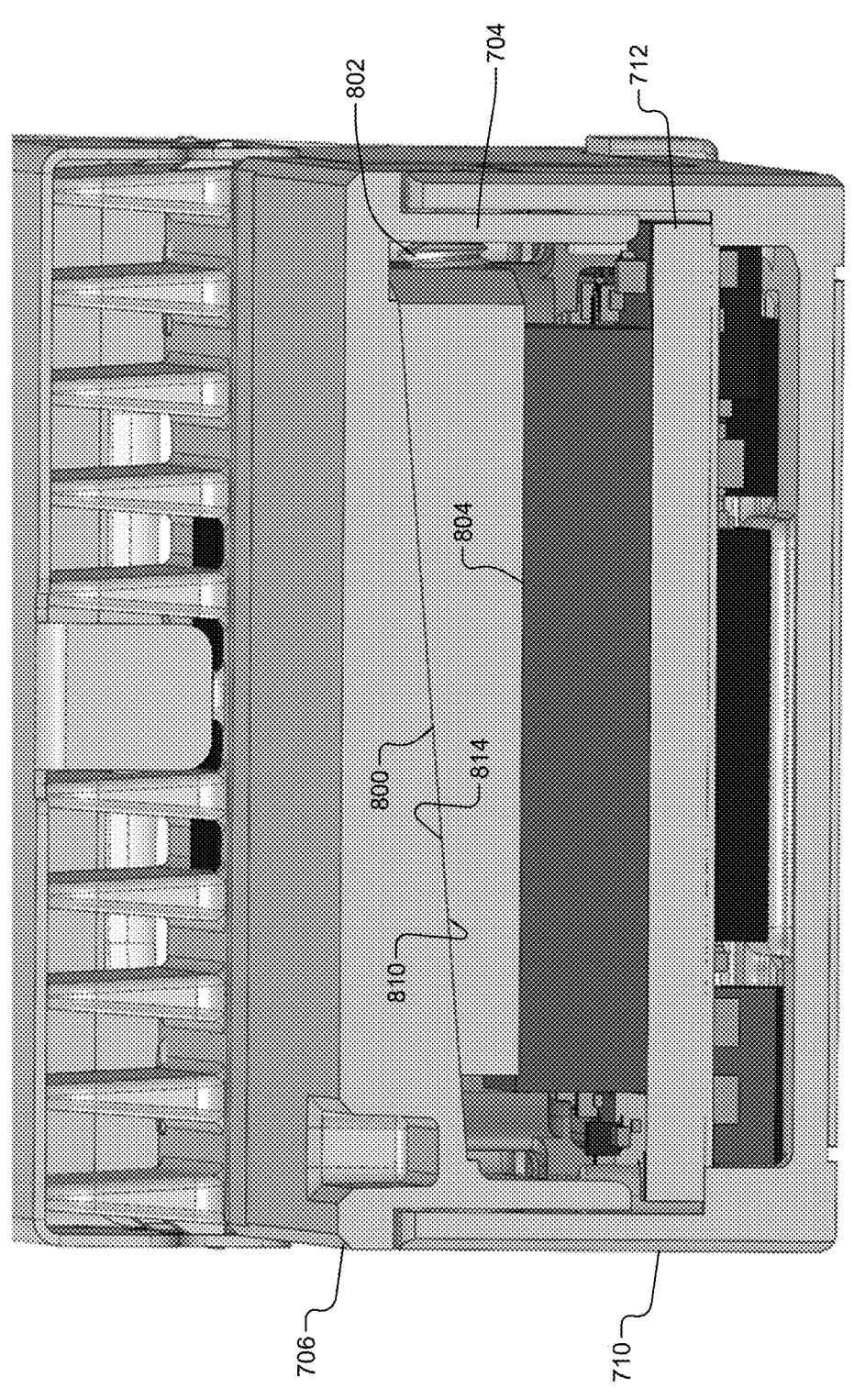
FIG. 8 is a cross-sectional perspective view of the pluggable transceiver module of FIG. 7 illustrating biasing the wedge-shaped shim with one or more screws in accordance with the present disclosure.

FIG. 7 shows a portion 700 of a pluggable transceiver module, similar to the pluggable transceiver module 400 of FIG. 4. FIG. 7 illustrates side holes 702 for biasing a wedge-shaped shim, such as the wedge-shaped shims shown in FIGS. 5-6B. In an embodiment, one or more side holes are included. In the example shown, two side holes are included. The side holes 702 extend through a side 704 of an upper housing 706. The side holes 702 provide access to respective set screws, an example of which is shown in FIG. 8. The set screws are used to bias the wedge-shaped shim against the upper housing 706 and a thermal energy generating component.

The pluggable transceiver module further includes a lower housing 710 and a PCB 712 that extends rearward from the lower housing 710. The PCB 712 includes conductive traces (or contacts) 714 that contact conductive traces on, for example, a motherboard of a network device (e.g., one of the network devices shown in FIG. 10) that the pluggable transceiver module is plugged into.

FIG. 8 shows a cross-sectional perspective view of the pluggable transceiver module of FIG. 7 illustrating biasing a wedge-shaped shim 800 with one or more screws (one set screw 802 is shown). The pluggable transceiver module includes the upper housing 706 and the lower housing 710. The wedge-shaped shim 800 is disposed between the upper housing 706 and a thermal energy generating component 804. The thermal energy generating component 804 is mounted on the PCB 712. The set screws are used to bias the wedge-shaped shim 800 against the upper housing 706 by moving and/or pushing the wedge-shaped shim 800 in a first direction towards the bottom surface 810 of the upper housing 706. The set screws screw into the wedge-shaped shim 800 and when unscrewed contact the side 704 of the upper housing and bias the wedge towards the bottom surface 810. The diameters of the set screws are larger than the diameters of the holes 702 of FIG. 7. When biased, a top surface 814 of the wedge-shaped shim 800 contacts and applies pressure on the bottom surface 810. When unbiased, the top surface 814 i) contacts or does not contact the bottom surface 810, and ii) does not apply pressure on the bottom surface 810.

Figure 9:
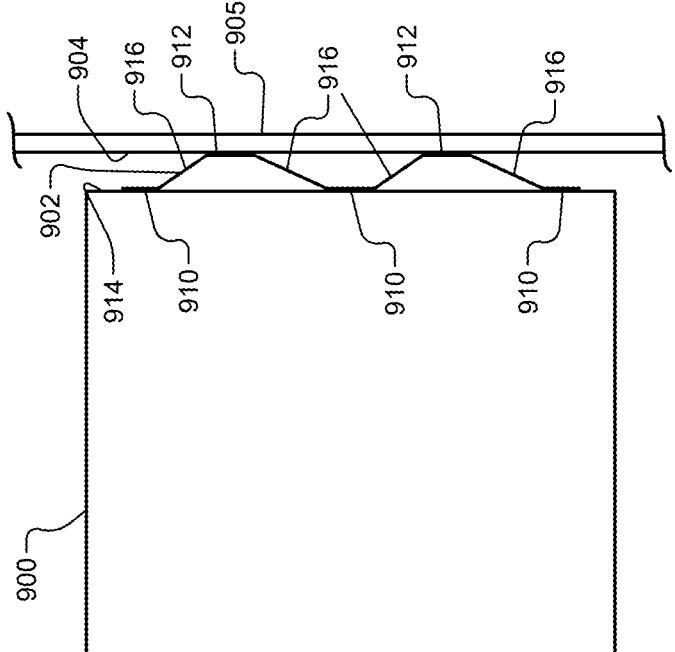
FIG. 9 is a top view of an example wedge-shaped shim being biased by a spring in accordance with the present disclosure.

FIG. 9 shows a top view of a wedge-shaped shim 900 being biased by a spring 902, for example a leaf spring. One or more springs and/or other biasing elements are able to be used instead of biasing screws to bias a wedge-shaped shim. The spring 902 is disposed between the wedge-shaped shim 900 and a side 904 of an upper housing 905 of a pluggable transceiver module, such as one of the pluggable transceiver modules of FIGS. 4-7. FIG. 9 provides an illustrated example of another biasing member that can be used instead of the biasing screw of FIG. 8. In another embodiment, the spring 902 has a different shape and/or configuration than shown in FIG. 9. In yet another embodiment, the spring 902 contacts the wedge-shaped shim 900 and the side 904. In an embodiment, the spring 902 is a leaf spring. In an embodiment, the spring 902 includes first members 910 and second members 912. The first members 910 are biased against a side 914 of the wedge-shaped shim 900. The second members 912 are biased against the side 904 of the upper housing 905. Third members 916 connect the first members 910 to the second members 912. In an embodiment, the members 910, 912, 916 are portions of a single part.

Figure 10:
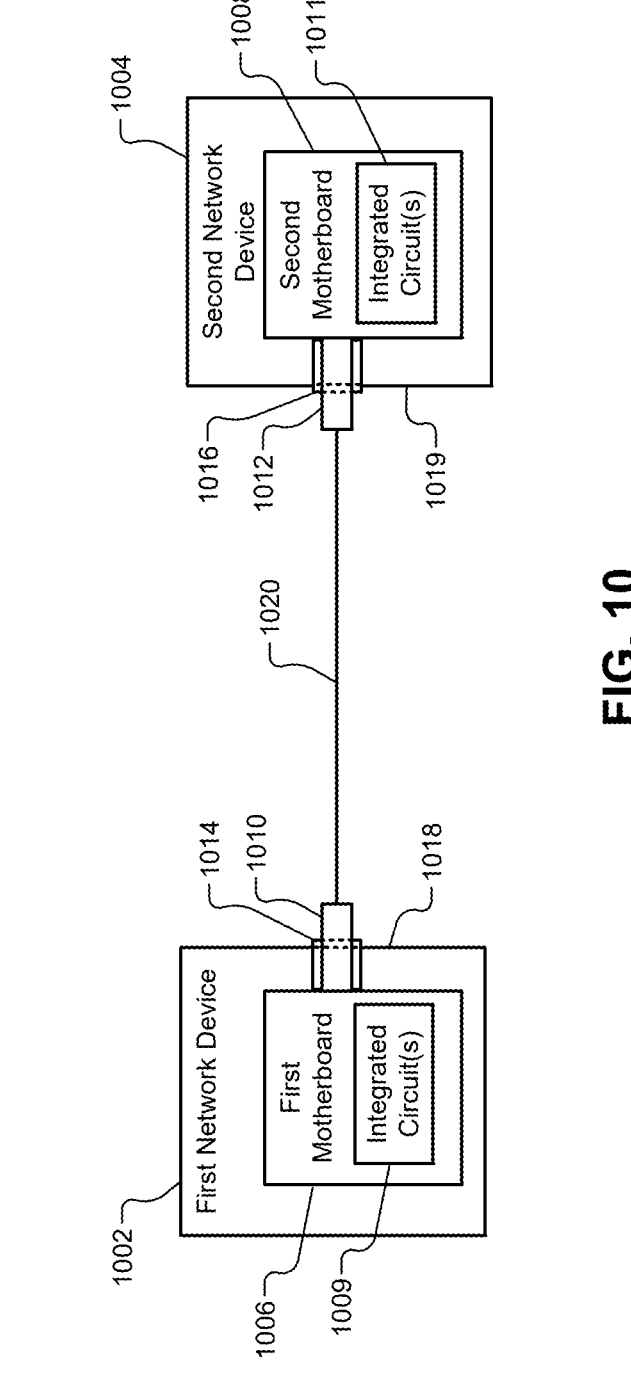
FIG. 10 is a functional block diagram of a communication system including network devices with pluggable transceiver modules in accordance with the present disclosure.

FIG. 10 shows a communication system 1000 that includes a first network device 1002 and a second network device 1004. The network devices 1002, 1004 are network switches, computers, servers, and/or other network devices. In an embodiment, the network devices 1002, 1004 are network switches that are each connected to multiple other network devices. The network devices 1002, 1004 include respective motherboards 1006, 1008 that each have one or more respective integrated circuits 1009, 1011. The integrated circuits 1009, 1011 include processing circuits, transceivers, etc. for processing and transferring data between the network devices 1002, 1004 and/or other network devices.

Each of the network devices 1002, 1004 further includes one or more pluggable transceiver modules. In the example shown, the network devices 1002, 1004 include respective pluggable transceiver modules 1010, 1012. Although each of the network devices 1002, 1004 is shown having a single port for receiving a single pluggable transceiver module, each of the network devices 1002, 1004 can have any number of ports receiving a respective number of pluggable transceiver modules. The pluggable transceiver modules 1010, 1012 are inserted into cages and/or bezels. Two cages 1014, 1016 are shown. In an embodiment, sides 1018, 1019 of the network devices 1002, 1004 are plates through which the pluggable transceiver modules 1010, 1012 and the cages 1014, 1016 extend. In an embodiment, the cages 1014, 1016 are grounded providing electromagnetic interference (EMI) grounding of the pluggable transceiver modules 1010, 1012 preventing EMI signals from being transmitted from the pluggable transceiver modules 1010, 1012.

The pluggable transceiver modules 1010, 1012 are configured for electrical or optical communication. In an embodiment, one or more cables (e.g., copper cables or optical cables) are connected between the pluggable transceiver modules 1010, 1012. Each of the pluggable transceiver modules 1010, 1012 is configured similarly or the same as any of the pluggable transceiver modules disclosed herein. One cable 1020 is shown connected between the pluggable transceiver modules 1010, 1012. The cables connected between the pluggable transceiver modules 1010, 1012 of the network devices 1002, 1004 transfer electrical data signals or optical data signals between the pluggable transceiver modules 1010, 1012.

Each of the disclosed pluggable transceiver modules 1010, 1012 is a SFP transceiver module, a QSFP transceiver module, a QSFP-DD transceiver module, an OSFP transceiver module, and/or other pluggable transceiver module and includes a thermal energy transfer assembly similar to or the same as that shown and described with respect to FIGS. 1-9. The thermal energy transfer assemblies include the described thermal energy generating devices, heat sinks, wedge-shaped shims, TIM, etc.

Figure 11:
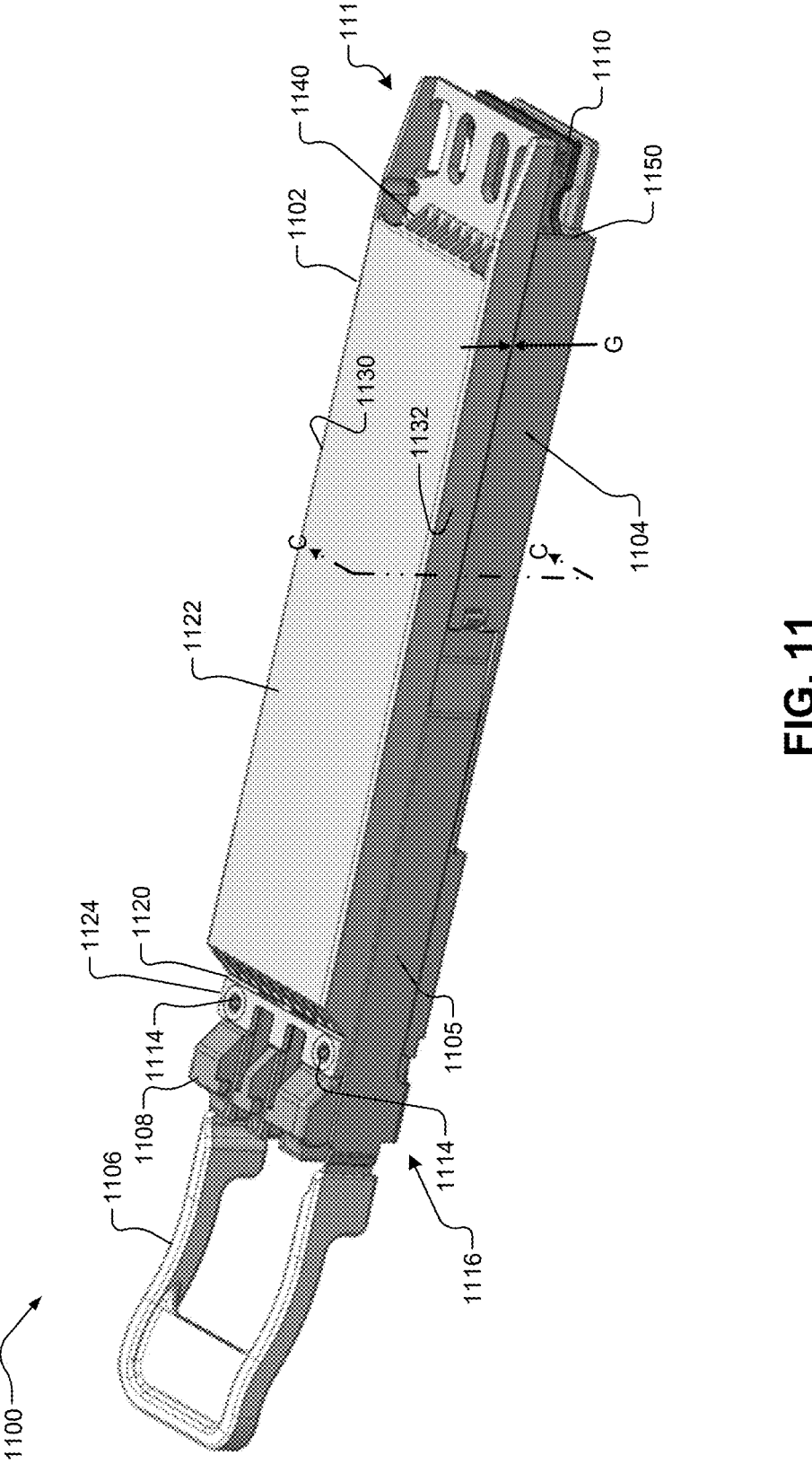
FIG. 11 is a perspective view of another pluggable transceiver module including a PCB supported upper housing in accordance with another embodiment of the present disclosure.

FIG. 11 shows a pluggable transceiver module 1100 that includes an upper housing 1102, a lower housing 1104, a release member 1105, a handle 1106, a connector 1108, and a PCB 1110. The upper housing 1102 extends from the connector 1108 to the insertable back end 1112 of the pluggable transceiver module 1100. The upper housing 1102 is connected to the release member or connector 1108 via fasteners 1114 at the front end 1116 near the connector 1108. The upper housing 1102 includes a relief groove 1120 that allows a first portion 1122 of the upper housing to rotate relative to a second portion 1124 of the upper housing 1102, which aids in installing and fastening down the upper housing 1102. The relief groove 1120 extends laterally between sides 1130, 1132 of the pluggable transceiver module 1100. The connector 1108 is configured for receiving copper cables or optical cables. The upper housing 1102 includes a heat sink 1140 embedded, integrally formed, and/or included in the upper housing 1102. The heat sink 1140 extends from the front end 1116 to the insertable back end 1112 and include channels through which air or other suitable fluid flows. In an embodiment, the upper housing 1102 and the heat sink are a single component.

In an embodiment, a gap G exists between the sides 1130, 1132 of the upper housing 1102 and sides (one side 1150 is shown) of the lower housing 1104 such that the upper housing 1102 is separated from and is not in contact with the lower housing 1104. The gap extends longitudinally from a back end of the sides of the lower housing 1104 forward along the sides 1130, 1132 of the upper housing to the release member 1105.

FIG. 12 shows a portion 1200 of the pluggable transceiver module 1100 of FIG. 11 illustrating support of the upper housing 1102. The upper housing 1102 is supported by the PCB 1110. The PCB 1110 is supported by the lower housing 1104. The lower housing 1104 includes first flanges 1202 that extend upward to support the PCB 1110. Although two of the first flanges 1202 are shown, other exist on the other side of the lower housing 1104. In an embodiment, the PCB 1110 contacts the first flanges 1202. The upper housing 1102 include second flanges 1204 that extend downward from the upper housing and in an embodiment are supported by and/or contact the PCB 1110. Although one of the second flanges 1204 is shown, another one exists on the other side of the upper housing 1202 opposite the shown one of the second flanges 1204. In an embodiment, the second flanges 1204 are triangular shaped, as shown. The second flanges extend downward along sides of a thermal energy generating component 1206. In an embodiment, the upper housing 1202 is not floating and is supported by the PCB 1110. The PCB 1110 extends to the back end 1112. An end of the PCB 1110 furthest from the handle 1106 of FIG. 11 is designated 1210.

In another embodiment, the upper housing 1202 is in contact with the thermal energy generating component 1206. In yet another embodiment, TIM 1208 is disposed between the upper housing 1202 and the thermal energy generating component 1206. A lower portion 1220 of the upper housing 1102 includes the second flanges 1204 and holes 1222 for receiving pins 1224. The pins 1224 hold the upper housing 1102 relative to the PCB 1110 and the lower housing 1104. The pins 1224 extend through holes 1228 of the lower housing 1104, through notches 1230 in the PCB 1110, and through the holes 1222. In an embodiment, the pins 1224 include heads 1232 at a first end 1234 and are crimped and/or pressed at a second end 1236. The second ends 1236 are not shown crimped or pressed. The pins 1224 are another example of how an upper housing can be held relative to a lower housing. The screws 1114 of FIG. 11 and the pins 1224 are referred to as attachment points. In an embodiment, the pins 1224 are used to bias the upper housing 1102 against the lower housing 1104.

Circuit assemblies and/or components such as a laser assembly 1240, a silicon photonics chip 1242, TIA chips 1244, and a driver chip 1246, can be mounted on the PCB 1110. The silicon photonics chip converts optical signals from the connector 1108 of FIG. 11 to electrical signals and converts electrical signals from, for example, a motherboard of a network switch, to optical signals for transmission via the connector 1108. In an embodiment, the silicon photonics chip 1242 is mounted on a top side of the PCB 1110 along with a DSP. The DSP being the thermal energy generating component 1206, which is mounted rearward of the silicon photonics chip 1242.

The examples disclosed herein minimize and/or eliminate gaps between thermal energy generating components and corresponding heat sinks. The minimization and/or elimination of the gaps minimizes relative shifting between the thermal energy generating components and heat sinks and maximizes thermal conductivity between the thermal energy generating components and the heat sinks. The examples minimize thickness variation caused by assembly and mechanical piece-part variations and contributes to meeting device form factor requirements according to the MSA. The examples include wedge-shaped shims that provide a thermal energy transfer medium having a high thermal conductivity. As an example and in an embodiment, the wedge-shaped shims are formed of a copper alloy having a thermal conductivity of 370 W/mk, which is significantly higher than that of air gaps, TIM, and other mediums. The amount and/or thickness of TIM between parts is minimized to maximize thermal conductivity i) between thermal energy generating devices and heat sinks, ii) between thermal energy generating devices and wedge-shaped shims, and/or iii) between wedge-shaped shims and heat sinks. This improves thermal energy transfer efficiency and thus heat evacuation performance of the corresponding pluggable transceiver modules.

The increased efficiency allows cooling fan speeds for directing air across the pluggable transceiver modules to be decreased to save energy. Improved thermal energy dissipation performance leads to improved yields of satisfactory pluggable transceiver modules during manufacturing of the pluggable transceiver modules. As an example, a pluggable transceiver module that exceeds a predetermined temperature threshold during testing can be deemed an unsatisfactory module and can be discarded or binned for use in environments that may have less stringent cooling requirements. The disclosed examples reduce the number of pluggable transceiver modules that exceed the predetermined temperature threshold due to improved thermal energy dissipation and thus reduce the number of pluggable transceiver modules discarded. The improved thermal dissipation performance also provides improved operation reliability of pluggable transceiver modules and increased lifetime performance. The improved thermal dissipation performance also allows for increased thermal energy generation and dissipation for cooling high-speed components.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between components) are described using various terms, including "connected" and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, sides, surfaces, portions, arms, etc. these elements, components, sides, surfaces, portions, arms, etc. should not be limited by these terms, unless otherwise indicated. These terms may be only used to distinguish one element, component, side, surface, portion, arm, etc. from another element, component, side, surface, portion, arm, etc. Terms such as "first," "second," and other numerical terms when used herein do not imply a sequence or order unless clearly indicated by the context. Thus, a first element, component, side, surface, portion, arm, etc. could be termed a second element, component, side, surface, portion, arm, etc. without departing from the teachings of the example embodiments.

What is claimed is:

1. A pluggable transceiver module comprising:
   a first end configured to plug into a network device;
   a second end opposite the first end and configured to be located external to the network device when the first end is plugged into the network device;
   a lower housing enhousing a printed circuit board;
   an upper housing comprising a first heat sink and configured to float above the lower housing such that the upper housing is at least one of i) not fastened to the lower housing, and ii) not resting on the lower housing, wherein at least side portions of the upper housing do not contact sides of the lower housing, and wherein the upper housing is held in place relative to the lower housing; and
   a thermal energy generating component mounted on the printed circuit board and configured to support the first heat sink, which dissipates thermal energy received from the thermal energy generating component.

2. The pluggable transceiver module of claim 1, further comprising a second heat sink forward of the first heat sink, wherein the upper housing is held in place relative to the lower housing using attachment points at ends of the upper housing, the attachment points referring to i) a portion of the second heat sink overhanging flanges of the lower housing, and ii) hooked portions of the upper housing engaging hooked portions of the lower housing.

3. The pluggable transceiver module of claim 1, wherein the upper housing is configured to float above the lower housing such that gaps exist between the side portions of the upper housing and sides of the lower housing.

4. The pluggable transceiver module of claim 1, further comprising a holding clip configured to at least partially hold the upper housing in place relative to the lower housing.

5. The pluggable transceiver module of claim 4, wherein the holding clip is configured to at least partially hold the lower housing in place relative to the upper housing.

6. The pluggable transceiver module of claim 4, wherein:
the first heat sink comprises a recessed area; and
the holding clip is disposed in the recessed area.

7. The pluggable transceiver module of claim 4, wherein:
at least one gap exists between the first heat sink and the holding clip; and
the holding clip is configured, due to the gap, to flex around the first heat sink and hook onto the lower housing and bias the first heat sink against the thermal energy generating component.

8. The pluggable transceiver module of claim 4, wherein the holding clip comprises one or more hooks that are configured to mate with corresponding receptacles formed in the lower housing to fix the upper housing in place relative to the lower housing.

9. The pluggable transceiver module of claim 1, wherein:
the first heat sink comprising a thermally conductive boss and a plurality of heat radiating elements;
the thermally conductive boss is configured to contact the thermal energy generating component; and
the plurality of heat radiating elements are configured to extend away from the thermally conductive boss and dissipate thermal heat from the first heat sink.

10. The pluggable transceiver module of claim 9, wherein the thermally conductive boss extends downward from the plurality of heat radiating elements and abuts the thermal energy generating component.

11. The pluggable transceiver module of claim 9, wherein a thermal interface material is disposed at least partially between the thermally conductive boss and the thermal energy generating component and exhibits less thermal resistance as compared to an air gap between the thermally conductive boss and the thermal energy generating component.

12. The pluggable transceiver module of claim 1, wherein:
the side portions of the upper housing are configured as a pair of flanges; and
the pair of flanges extend downwardly from a body of the upper housing toward sides of the lower housing to at least one of i) hold the upper housing in a lateral orientation relative to the lower housing, and ii) limit or prevent movement of the upper housing laterally relative to the lower housing.

13. The pluggable transceiver module of claim 12, wherein the pair of flanges and a thermally conductive boss of the first heat sink at least partially define a pair of channels.

14. A communication system comprising:
the pluggable transceiver module of claim 1; and
the network device comprising a motherboard, the motherboard comprising an integrated circuit for processing and transferring data to and from the pluggable transceiver module; and
wherein the pluggable transceiver module of claim 1 is plugged into the motherboard.

15. A pluggable transceiver module comprising:
a first end configured to plug into a network device;
a second end opposite the first end and configured to be located external to the network device when the first end is plugged into the network device;
a lower housing component enhousing a printed circuit board;
a thermal energy generating component disposed on the printed circuit board;
a wedge-shaped shim configured to be in thermal contact with the thermal energy generating component and configured to transfer thermal energy away from the thermal energy generating component; and
an upper housing configured to thermally contact the wedge-shaped shim and the lower housing component, the upper housing comprising a heat sink, the heat sink disposed on the wedge-shaped shim configured to dissipate thermal energy received from the wedge-shaped shim.

16. The pluggable transceiver module of claim 15, wherein the thermal energy generating component is a digital signal processor.

17. The pluggable transceiver module of claim 15, wherein:
the wedge-shaped shim comprises a first surface, a second surface and side surfaces extending between the first surface and the second surface;
the first surface extends parallel to and thermally contacts a surface of the upper housing; and
the second surface extends parallel to and contacts the thermal energy generating component.

18. The pluggable transceiver module of claim 15, further comprising at least one biasing element, wherein the at least one biasing element is configured to bias the wedge-shaped shim toward a surface of the upper housing and provide thermal contact with the thermal energy generating component and the heat sink.

19. The pluggable transceiver module of claim 18, wherein the at least one biasing element comprises a screw disposed between a side of the upper housing and the wedge-shaped shim.

20. The pluggable transceiver module of claim 18, wherein the at least one biasing element comprises a spring disposed between a side of the upper housing and the wedge-shaped shim.

21. The pluggable transceiver module of claim 20, wherein the spring is a leaf spring comprising first members biased against the side of the upper housing and second members biased against a side of the wedge-shaped shim.

22. The pluggable transceiver module of claim 15, wherein the thermal energy generating component is mounted on the printed circuit board.

23. The pluggable transceiver module of claim 15, further comprising another component mounted on the printed circuit board, wherein the thermal energy generating component is disposed on the another component.

24. The pluggable transceiver module of claim 23, wherein the another component is an interposer or a chip.

25. The pluggable transceiver module of claim 15, wherein thermal interface material is disposed at least one of i) between the wedge-shaped shim and the upper housing, and ii) between the wedge-shaped shim and the thermal energy generating component.

26. The pluggable transceiver module of claim 15, wherein the wedge-shaped shim contacts the upper housing and the thermal energy generating component.

27. The pluggable transceiver module of claim 15, wherein the upper housing is structured as a heat sink.

28. A communication system comprising:
the pluggable transceiver module of claim 15; and
the network device comprising a motherboard, the motherboard comprising an integrated circuit for processing and transferring data to and from the pluggable transceiver module; and
wherein the pluggable transceiver module is plugged into the motherboard.

29. The pluggable transceiver module of claim 15, wherein the wedge-shaped shim is disposed between the upper housing and the thermal energy generating component.

30. The pluggable transceiver module of claim 15, wherein:
the wedge-shaped shim comprises a first surface, a second surface and side surfaces extending between the first surface and the second surface; and
at least one of
the first surface extends parallel to and contacts a surface of the upper housing, and
the second surface extends parallel to and contacts the thermal energy generating component.

31. The pluggable transceiver module of claim 30, wherein:
the first surface extends parallel to and contacts the surface of the upper housing; and
the second surface extends parallel to and contacts the thermal energy generating component.

32. The pluggable transceiver module of claim 15, wherein:
the wedge-shaped shim comprises a first surface, a second surface and side surfaces extending between the first surface and the second surface;
the second surface extends at an acute angle relative to the second surface; and the acute angle matches an angle of a bottom surface of the upper housing.

33. A pluggable transceiver module comprising:
a first end configured to plug into a network device;
a second end opposite the first end and configured to be located external to the network device when the first end is plugged into the network device;
a lower housing enhousing a printed circuit board;
an upper housing comprising a heat sink, the upper housing supported by the printed circuit board and separated from and held in place relative to the lower housing;
a thermal energy generating component mounted on the printed circuit board and dissipating thermal energy to the heat sink; and
a plurality of pins extending through the lower housing, the printed circuit board, and the upper housing and configured to hold the upper housing in place relative to the lower housing.

34. The pluggable transceiver module of claim 33, further comprising a thermal interface material disposed between the heat sink and the thermal energy generating component, the thermal interface material having a lower thermal resistance than air.

35. The pluggable transceiver module of claim 33, wherein the upper housing comprises a plurality of flanges extending down from the upper housing a resting on the printed circuit board to support the upper housing above the thermal energy generating component.

36. The pluggable transceiver module of claim 35, wherein the plurality of flanges are triangle shaped and extend from sides of the upper housing.

37. The pluggable transceiver module of claim 33, wherein the lower housing comprises a plurality of flanges extending upward and supporting the printed circuit board.

38. The pluggable transceiver module of claim 33, wherein:
the lower housing comprises first flanges extending upward to support the printed circuit board; and
the upper housing comprises flanges extending downward and are supported by the printed circuit board.

39. The pluggable transceiver module of claim 33, wherein the plurality of pins extend through notches in the printed circuit board.

40. The pluggable transceiver module of claim 33, wherein the plurality of pins i) comprise heads at first ends of the plurality of pins, and ii) are at least one of crimped and pressed at second ends of the plurality of pins.

\* \* \* \* \*